United States Patent Office 2,805,995
Patented Sept. 10, 1957

2,805,995

LUBRICATING COMPOSITION

David E. Adelson, Berkeley, Calif., assignor to Shell Development Company, Emeryville, Calif., a corporation of Delaware No Drawing. Application February 1, 1954,
Serial No. 407,578

16 Claims. (Cl. 252—33.6)

This invention relates to novel reaction products having properties of greatly improving base lubricants. The invention also relates to lubricating compositions containing minor amounts of these reaction products.

Lubricating compositions under various conditions of use such as low and high temperatures, extreme pressure conditions, and the like tend to deteriorate, form sludge and carbonaceous deposits, and cause corrosion and wear of engine parts. In order to inhibit or prevent such conditions from developing, various oil-additives and combinations thereof have been used, each of which possesses a particular property or set of properties to serve a corresponding function. However, in the use of combinations of additives which serve different functions or of a single additive containing a combination of two or more useful functional groups, in many cases there exists an incompatibility or interference between different functional groups.

It is an object of this invention to provide lubricants having improved properties by providing base lubricating oils with a minor amount of a multi-functional material. A more specific object of this invention is to provide oleaginous materials, mineral lubricating oils, synthetic lubricants and the like, with a multi-functional material exhibiting therein anti-oxidation, anti-corrosion and anti-sludging properties. Still another object of this invention is to provide lubricating compositions containing a multi-functional material which exhibits anti-ringsticking properties. Also, it is an object of this invention to provide lubricating compositions with a multi-functional material which inhibits wear, scuffing, scratching, and the like, and which damages relatively moving metal parts being lubricated therein. Furthermore, it is an object of this invention to provide novel multi-functional additives for lubricating compositions. Others objects will appear from the description of the invention.

Now in accordance with the present invention, there is provided a useful group IV–A tetravalent metal salt of a sulfur-containing reaction product of a reactive organic compound and hydrogen sulfide in the presence of ammonium hydrosulfide, and there is also provided an improved lubricating composition comprising a liquid lubricating base, such as a mineral lubricating oil, and the foregoing metal salt.

The metal salts of this invention are readily prepared by treatment of the reactive organic compounds, such as a suitable ketone as set forth in greater detail hereinafter, simultaneously with a group IV–A tetravalent metal inorganic compound, such as a tetrahalide, and hydrogen sulfide in the presence of ammonium hydrosulfide, and preferably in the presence of a peroxide catalyst, such as an organic peroxide. Instead of such simultaneous treatment, the reactions with the metal compound and with the hydrogen sulfide-ammonium hydrosulfide reactant can be effected separately and in either order.

The reaction product of the reactive organic compound with the hydrogen sulfide-ammonium hydrosulfide reactant is the subject of applicant's U. S. Patent 2,512,784.

Although its exact chemical nature is not known and no detail chemical formula can be written for it in any given case, it can be represented by the designation $A \cdot S_x$, wherein A is the organic portion derived from the reactive organic compound and $x$ denotes the number of atomic proportions of sulfur per unit part of A. Since the sulfur may be in the form of one or more thiol or thiono sulfurs, wherein $x$ would be an integral value, and/or in the form of one or more sulfide sulfurs, wherein $x$ would be a fractional value for each unit of A, it is seen that $x$ can have different values, integral or fractional, from less than unity to a value above unity. Generally, it will have a value from about one-fourth to a value of about four, and preferably from about one-half to a value of about two. The final product will usually contain at least about 4% sulfur but it may be as low as about 3% and as high as about 27%. The metal salts of the present invention, from the evidence which is available, such as analysis as well as the synthesis, contains the metal and halogen in essentially the same ratio as the ratio in which they exist in the metal tetrahalide. Furthermore, the $A \cdot S_x$ reactant retains essentially the same elements in essentially the same proportions, although the units therefrom which exist in the metal salt may be simple fractions or multiples thereof (generally one-half, one or two). Thus, the salts can be represented by the empirical relationship $(A \cdot S_x)_n \cdot (MX_4)_m$ or $A_n, S_{nx}M_mX_4$, wherein $n$ is a small number, fractional or integral, generally from one-half to two, $MX_4$ is the metal tetrahalide or mixture of metal tetrahalides, and $m$ is a small number, fractional or integral, generally from about one-half to about four, more usually from about one to about two, and the ratio of $m$ to $n$ is generally from about one-half to about four, usually from about one to about two. It is to be understood that the foregoing formula represents the proportions of the various constituent parts present and it is not intended to denote the structure of the product. In fact, it is considered that the product is a metal salt with metal-to-oxygen and/or metal-to-sulfur primary linkages.

In accordance with a preferred method of making the salts of the invention, the organic compound is saturated with hydrogen sulfide in the presence of ammonium sulfide in a closed vessel at room or elevated temperature for a period of from one week to one month or more. The reaction is continued until no more sulfur reacts or enters the organic compound being treated. This sulfur-containing material is then treated with a group IVA metal tetrahalide, preferably a tetrachloride, such as tin or lead tetrachloride, in the mole ratio of 15:1 to 1:10 and preferably in the mol ratio of from 1:1 to 1:4, respectively; in the presence of an organic peroxide such as di-tertiary butyl peroxide, as catalyst, at an elevated temperature of between about 100° C. and about 200° C., and preferably from about 150° C. to about 170° C. and, if desired, in the presence of a suitable inert solvent, until substantial amounts of both metal and halogen are present in the reaction product. When the order of reactions is reversed, the organic compound is first treated with the metal halide under suitable reaction conditions and this product is thereafter reacted to essential saturation with hydrogen sulfide-ammonium hydro-sulfide.

Suitable organic materials which can be used to form the products of this invention, include non-polar and polar-containing compounds such as unsaturated hydrocarbons of the aliphatic, cycloaliphatic and aromatic type as well as hydrocarbon oils, fixed oils, and derivatives thereof, and polar compounds such as alcohols, ketones aldehydes, esters, and acids, any one of which can be of the aliphatic, cycloaliphatic, aromatic heterocyclic type. The suitable hydrocarbons include aliphatic olefins and polyolefins having at least 6 carbon atoms, such as hexenes, octenes, dodecenes, octadecene-1, polybutene, polyisobutylene, cracked wax olefins; cyclic olefinic compounds such as cyclopentadiene, dicyclopentadiene, cyclooctene, limonene, pinene, and dipentene; aromatic hydrocarbons, such as alkyl benzene, naphthalene, anthracene, stilbene, diphenylmethane, etc.; petroleum hydrocarbon mixtures such as naphtha, mineral seal oil, kerosene, gas oil; fixed oils, waxes and derivatives thereof such as: cocoanut oil, neat's-foot oil, palm oil, peanut oil, rapeseed oil, soya bean oil, sperm oil, whale oil, wool fat, petrolatum, vegetable and animal phosphatidic materials, montan wax, beeswax, spermaceti, tall oil, and the like.

Illustrative polar-containing compounds include: alcohols of the alkyl, cycloalkyl, and aryl type such as octanol, decanol, dodecanol, octadecanol, oleyl alcohol, abietyl alcohol, borneol, terpineol, cyclohexanol, methylcyclohexanol, benzyl alcohol, cinnamyl alcohol; alcohols as found in wool fat and sperm oil; phenols such as the cresols, xylenols, naphthols, and resorcinol; ketones such as hexanone, oleone, palmitone, cyclohexanone, tropolone, camphor isophorone, and isophorone bottoms fully described in U. S. Patents 2,489,249 and 2,574,949; aliphatic and aromatic aldehydes including acetaldehyde, acrolein, citral, benzaldehyde, cinnamaldehyde, salicylaldehyde; esters such as vinyl stearate, methyl ricinoleate, ethyl oleate, oleyl stearate, allyl laurate, glyceryl monooleate; free acids including the aliphatic or aromatic mono or polycarboxylic acid type such as lauric, stearic, oleic, linoleic, ricinoleic, alkenyl succinic, alkyltartaric and citric acids, as well as acids produced by oxidation of hydrocarbons such as paraffin wax, or aromatic acids such as benzoic, salicyclic, and phthalic acids, as well as acids of the cyclic type such as naphthenic and abietic acids or organic compounds containing inorganic acid radicals such as organic sulfonic acids derived from petroleum, dilauryl acid phosphate, and the like.

Although there are many classes of reactive organic compounds which are suitable for the practice of this invention, those with an unsaturated linkage (C=C, C=O, C=S) are preferred, certain classes of compounds and even certain specific compounds within those classes being particularly useful and being preferred, as follows: unsaturated ketones (isophorone, phorone, mesityl oxide, isophorone bottoms); unsaturated esters (methyl ricinoleate, glycerol ricinoleate, ethyl ricinoleate, ethyl cinnamate, ethyl oleate); alcohol-ketones (diacetone alcohol, tropolone); unsaturated alcohols (cinnamyl alcohol, terpineol, oleyl alcohol, abietyl alcohol); higher molecular weight olefins and cycloolefins (octadecene-1, cracked wax olefins, pinene, camphene, propylene tetramer, stilbene); saturated ketones (pentadione-2,4, dibutyl ketone); fixed oils (cottonseed oil, rapeseed oil, peanut oil, dihydrated castor oil).

The tetravalent metal halides used in forming the salts of this invention are compounds in which the cation portion is a metal selected from group IV-A of the periodic table (Demming's Fundamental Chemistry, 2nd edition) having an atomic number between 50 and 82 (tin and lead). The anionic portion of the metal halide is a halogen i. e., chlorine, bromine and/or fluorine (a halogen having an atomic number of from 17 to 35, inclusive). The metal halides contemplated are tin tetrachloride, tin tetrabromide, lead tetrachloride, lead tetrabromide, tin tetrafluoride.

The application of the invention will be more readily understood from the following examples, which are illustrative but not limitative of the invention.

EXAMPLE I: A-INITIAL REACTION PRODUCT

Isopropyl alcohol (700 cc.) contained in a 4-liter, thick-walled suction flask, was saturated with dry ammonia followed by dry hydrogen sulfide. A solution of 238.5 grams of topped, crude isophorone bottoms in 350 cc. isopropyl alcohol was added and the resulting solution was saturated with hydrogen sulfide. The side-neck and mouth of the flask were then closed and the closed flask was allowed to stand for a week with infrequent shaking. Upon opening the flask a partial vacuum was discovered. The reaction mixture was filtered to remove impurities and the isopropyl alcohol was removed from the filtrate by evaporation. The residue was dissolved in 500 cc. of a non-aromatic hydrocarbon naphtha having a boiling range of between about 164° F. and 233° F. and washed with water. After removal of the solvent in a current of nitrogen gas on a steam bath, a very viscous sticky mass was obtained, said mass possessing a pleasant odor and exhibiting much less flow at room temperature than did the starting material. The product was oil-soluble and on analysis contained:

| | Analysis of Product | Analysis of cyclic Ketone (topped, crude isophorone bottom) |
|---|---|---|
| Percent by wt. Sulfur | 7.2(5) | |
| Percent by wt. Carbon | 76.2(1) | 79.5(9) |
| Percent by wt. Hydrogen | 9.6(2) | 9.8(9) |
| Percent by wt. Nitrogen | 0.26 | |
| Percent by wt. Oxygen (by difference) | 6.6(6) | 10.5(2) |
| Mole wt. (ebullioscopic determination in $C_6H_6$) | 352 | 316 |
| Empirical Formula | | $C_{21}H_{32}O_2$ |

B. *Final reaction product obtained by treating (IA) with stannic chloride*

To approximately one mole of the above initial reaction product (IA), about four moles of stannic chloride was added dropwise and the mixture heated in the presence of a catalytic amount of ditert.-butyl peroxide, for about 24 hours under agitation at approximately 75° C.–115° C. At the end of the reaction time the volatile materials including unreacted stannic chloride were removed from the reaction mixture by distillation in vacuo in a stream of nitrogen. The residue was a dark mass readily soluble in mineral oil and contained, in addition to sulfur, about 25% tin and about 30% chlorine, which is in essentially the same ratio as the ratio in which they exist in stannic chloride.

EXAMPLE II: A-INITIAL REACTION PRODUCT

Ethyl oleate (53.6 gm.) was treated with ammonium hydrosulfide and hydrogen sulfide in isopropyl alcohol solution for one week and the desired product removed as indicated in Example IA. The product on analysis contained 4.0% sulfur and proved to be an excellent rust and wear inhibitor.

B. *Final reaction product obtained by treating IIA with stannic chloride*

To approximately one mole of initial reaction product IIA about four moles of stannic chloride was added dropwise and the mixture heated in the presence of a catalytic amount of di-tert.-butyl peroxide at 95° C.–120° C. for about 24 hours. The volatile materials were removed from the reaction mass by distillation in vacuo in a stream of nitrogen. The residue, in addition to containing sulfur, contained substantial percentages each of tin and chlorine, and was oil soluble.

EXAMPLE III: A-INITIAL REACTION PRODUCT

A mixture of anhydrous stannic chloride and a mixture of $C_8$—$C_{24}$ cracked wax olefins, in the mol ratio of 4 to 1, respectively, was heated in the presence of a catalytic amount (0.01 mol fraction) of di-tert.-butyl peroxide for about 24 hours at a temperature of from 95° C.–110° C. At the end of the reaction period the volatile materials were removed from the reaction mass by distillation in vacuo in a stream of nitrogen and the residue, which was a black mass, contained about 30% tin and about 35% chlorine.

B. *Final reaction product obtained by treating (IIIA) with NH₄HS—H₂S*

The initial reaction product IIIA was reacted with ammonium hydrosulfide-hydrogen sulfide in isopropyl alcohol medium in an autoclave under the conditions as indicated in IA. The product on analysis contained tin and chlorine as indicated in IIIA and additionally contained about 4% sulfur and only a trace, less than 0.3% of nitrogen. The product was oil-soluble.

EXAMPLE IV: A-INITIAL REACTION PRODUCT

Following the procedure of IIIA, topped, crude isophorone bottoms was reacted with stannic chloride in the presence of di-tert.-butyl peroxide catalyst. The residue was a black viscous mass of grease-like consistency which by analysis contained 31% tin and 37.9% chlorine.

B. *Final reaction product obtained by treating (IVA) with NH₄HS—H₂S*

The initial reaction product of IVA was reacted with ammonium hydrosulfide-hydrogen sulfide in isopropyl alcohol medium in an autoclave under the conditions as indicated in IA. The product on analysis contained tin and chlorine as indicated in IVA and additionally contained about 4% sulfur and only a trace, less than 0.3% of nitrogen. The product was oil-soluble.

EXAMPLE V: A-INITIAL REACTION PRODUCT

Following the same procedure as in IA, cinnamyl alcohol was reacted with ammonium hydrosulfide-hydrogen sulfide and by analysis the reaction product contained over 4% sulfur and was essentially free from nitrogen.

B. *Final reaction product obtained by treating (VA) with stannic chloride*

The initial reaction product (VA) was reacted with stannic chloride in the presence of a catalytic amount of di-tert.-butyl peroxide in the mole ratio of 1 to 4, respectively, for over 24 hours at a temperature of from 95° to 120° C. The volatile materials were removed as described above and the residue on analysis contained in addition to sulfur, substantial amounts of tin and chlorine.

EXAMPLE VI: A-INITIAL REACTION PRODUCT

Following the same procedure as in IA, cinnamaldehyde was reacted with ammonium hydrosulfide-hydrogen sulfide and by analysis the reaction product contained over 6% sulfur and only a trace of nitrogen.

B. *Final reaction product obtained by treating (VIA) with stannic chloride*

The initial reaction product (VIA) was reacted with stannic chloride in the presence of a catalytic amount of di-tert.-butyl peroxide in the mol ratio of 1 to 4, respectively, for over 24 hours at a temperature of from 95° to 120° C. The volatile materials were removed as described above and the residue by analysis contained in addition to sulfur, substantial amounts of tin and chlorine.

EXAMPLE VII

The reaction product of Example IA was treated with stannic chloride as described in IB except that the mol ratio of the reactants used was 1 to 1, respectively. The final reaction product was oil-soluble and contained substantial proportions each of sulfur, tin, and chlorine.

EXAMPLE VIII: A-INITIAL REACTION PRODUCT

Following the same procedure as in IA, cinnamaldehyde was reacted with ammonium hydrosulfide-hydrogen sulfide and by analysis the reaction product contained over 6% sulfur and only a trace of nitrogen.

B. *Final reaction product obtained by treating (VIA) with stannic chloride*

The initial reaction product (VIA) was reacted with stannic chloride, in the presence of a catalytic amount of di-tert.-butyl peroxide, in the mol ratio of 1 to 1, respectively, for over 24 hours at a temperature of from 95° to 120° C. The volatile materials were removed as described above and the residue by analysis contained in addition to sulfur, substantial amounts of tin and chlorine.

Other reaction products of this invention which can be prepared by the methods described above include (I) salts obtained by reacting tin tetrachloride with the product of reacting ammonium hydrosulfide-hydrogen sulfide with (1) mesityl oxide, (2) diacetone alcohol, (3) stilbene, (4) pentandione-2,4, (5) oleic acid, (6) diphenyl methane, (7) ethyl undecylenate, (8) methyl ricinoleate, (9) rapeseed oil, (10) dehydrated castor oil; (II) salts obtained by reacting tin tetrafluoride with the product of reacting ammonium hydrosulfide-hydrogen sulfide with (1) wax olefins, (2) cottonseed oil, (3) tall oil, (4) cinnamyl alcohol, (5) cinnamaldehyde; (III) salts obtained by reacting tin tetrabromide with the product of reacting ammonium hydrosulfide-hydrogen sulfide with (1) isophorone bottoms, (2) oleic acid, (3) castor oil; (IV) salts obtained by reacting lead tetrabromide with the product of reacting ammonium hydrosulfide-hydrogen sulfide with (1) isophorone bottoms, (2) wax olefins, (3) oleic acid; (V) salts obtained by reacting tin tetrachloride with oleic acid and then treating said product with ammonium hydrosulfide-hydrogen sulfide.

The base oil of compositions of this invention can be any natural or synthetic substantially neutral liquid having lubricating properties. Thus, the base may be a hydrocarbon oil obtained from a paraffinic, naphthenic, asphaltic or mixed base crude oil, as well as mixtures thereof. The viscosity of these oils may vary over a wide range such as from 50 SUS at 100° F. to 100 SUS at 210° F. The hydrocarbon oils may be blended with fixed oils such as castor oil, lard oil and the like and/or with synthetic lubricants such as polymerized olefins, the polyalkylene glycols such as copolymers of alkylene glycols and lakylene oxides, organic esters, especially the polyesters, e. g., 2-ethylhexyl sebacate, dioctyl phthalate, trioctyl phosphate; polymeric tetrahydrofuran, polyalkyl polysiloxanes (silicones), e. g., dimethyl silicone polymer, and the like. If desired, the synthetic organic lubricants and the natural ester oils, such as the vegetable and animal oils, may be used as the sole base lubricants.

Mineral lubricating oils containing between 0.1% and 2% of the reaction product as described in Examples I and IV are excellent for various types of engine operation, giving clean engine performance under low or high temperature and under extreme pressure conditions.

Compounded lubricating oils of this invention can also contain other secondary additives such as corrosion inhibitors, such as sulfonic or fatty acids, extreme pressure compounds such as alkyl phosphates, friction-reducing compounds such as allophanates, interfacial tension modifiers or foam reducing agents, blooming agents, soaps, viscosity regulators such as acryloid polymers, etc.

The auxiliary additives may be used in amounts varying from 0.05% to about 5% by weight.

This application is a continuation-in-part of application Serial No. 178,167, filed August 7, 1950, now abandoned, which is a continuation-in-part of application Serial No. 718,617, filed December 26, 1946, and which has matured into U. S. Patent 2,512,784 and is a continuation of application, Serial No. 782,046, filed October 24, 1947, which has been abandoned.

I claim as my invention:

1. A lubricant comprising a major amount of a lubricating oil and from about 0.01% to about 5% by weight of a reaction product obtained by the methods selected from (a) by first reacting an organic compound selected from the group consisting of oxygen containing organic compounds containing only carbon, oxygen and hydrogen in the molecule and high molecular weight hydrocarbons with hydrogen sulfide-ammonium hydrosulfide at between about room temperature and 100° C. until at least about 4% sulfur has entered the reaction product and thereafter treating about 1 mole of the resulting reaction product with about 1 to 15 moles of a metal halide at a temperature of from about 100° C. to 200° C., said metal being selected from group IV–A of the periodic table and having an atomic number from 50 to 82, inclusive; and (b) a reaction product obtained by first reacting an organic compound as defined in (a) with a metal tetravalent halide, said metal being selected from group IV–A of the periodic table and the halide having an atomic number no greater than 35, in the mole ratio of from 1:15 to 10:1, respectively, and at a temperature of from about 100° C. to about 200° C., and treating said reaction product with hydrogen sulfide-ammonium hydrosulfide between about room temperature and 100° C. until at least about 4% sulfur has entered the reaction product.

2. A lubricant comprising a major amount of a lubricating oil and from about 0.1 to about 5% by weight of a reaction product obtained by reacting an oxygen containing organic compound containing only carbon, oxygen and hydrogen in the molecule with hydrogen sulfide-ammonium hydrosulfide at between about room temperature and 100° C. until at least about 4% of sulfur has entered the reaction product and treating about 1 mole of the resulting reaction product with about 1 to 4 moles of a tetravalent metal halide at a temperature of about 100° C. to 200° C., said metal being selected from group IV–A of the periodic table and having an atomic number from 50 to 82, inclusive, and the halide having an atomic number no greater than 35.

3. A lubricant comprising a major amount of a lubricating oil and from about 0.1 to about 5% by weight of a reaction product obtained by reacting a cyclic ketone fraction having at least 12 carbon atoms with hydrogen sulfide-ammonium hydrosulfide at between about room temperature and 100° C. until at least about 4% of sulfur has entered the reaction product and treating about 1 mole of the resulting reaction product with about 1 to 4 moles of a tetravalent metal halide at a temperature of about 100° C. to 200° C., said tetravalent metal being selected from group IV–A of the periodic table and having an atomic number from 50 to 82, inclusive, and the halide having an atomic number no greater than 35.

4. A lubricant comprising a major amount of a lubricating oil and from about 0.1 to about 5% by weight of a reaction product obtained by reacting a wax olefin with hydrogen sulfide-ammonium hydrosulfide at between about room temperature and 100° C. until at least 4% of sulfur has entered the reaction product and treating about 1 mole of the resulting reaction product with about 1 to 4 moles of a tetravalent metal halide at a temperature of about 100° C. to 200° C., said tetravalent metal being selected from group IV–A of the periodic table and having an atomic number from 50 to 82, inclusive, and the halide having an atomic number no greater than 35.

5. A lubricant comprising a major amount of a mineral lubricating oil and a minor amount, of from 0.1% to 5% by weight of a reaction product obtained by first reacting unsaturated cyclic ketone fraction having at least 12 carbon atoms with ammonium hydrosulfide-hydrogen sulfide, at between about room temperature and 100° C. and treating the resulting reaction product with a reactive tetravalent metal halide said metal having an atomic number of from 50 to 82 and the halide having an atomic number of from 17 to 35, at a temperature from 100° C. to 200° C.

6. A lubricant comprising a major amount of a mineral lubricating oil and a minor amount, of from 0.1% to 5% by weight of a reaction product obtained by first reacting saturated cyclic ketone fraction having at least 12 carbon atoms with ammonium hydrosulfide-hydrogen sulfide, at between about room temperature and 100° C. and treating the resulting product with a reactive tetravalent metal halide said metal having an atomic number from 50 to 82 and the halide having an atomic number of from 17 to 35, at a temperature from 100° C. to 200° C.

7. A lubricant comprising a major amount of a mineral lubricating oil and a minor amount, of from 0.1% to 5% by weight of a reaction product obtained by first reacting a high molecular weight hydrocarbon with ammonium hydrosulfide-hydrogen sulfide, at between about room temperature and 100° C. and treating the resulting reaction product with a reactive tetravalent metal halide said metal having an atomic number from 50 to 82 and the halide having an atomic number of from 17 to 35, at a temperature of at least 150° C.

8. A lubricant comprising a major amount of a mineral lubricating oil and a minor amount, sufficient to stabilize said oil against oxidation and corrosion deterioration, of a reaction product obtained by first reacting saturated cyclic ketone fraction having at least 12 carbon atoms with ammonium hydrosulfide-hydrogen sulfide, at between about room temperature and 100° C., and treating the resulting reaction product with tin tetrachloride at a temperature of at least 150° C.

9. A lubricant comprising a major amount of a mineral lubricating oil and a minor amount, sufficient to stabilize said oil against oxidation and corrosion deterioration, of a reaction product obtained by first reacting unsaturated cyclic ketone fraction having at least 12 carbon atoms with ammonium hydrosulfide-hydrogen sulfide, at between about room temperature and 100° C. and treating the resulting reaction product with tin tetrachloride at a temperature of at least 150° C.

10. A lubricant comprising a major amount of a mineral lubricating oil and a minor amount, sufficient to stabilize said oil against oxidation and corrosion deterioration, of a reaction product obtained by first reacting wax olefin with ammonium hydrosulfide-hydrogen sulfide, at between about room temperature and 100° C. and treating the resulting reaction product with tin tetrachloride at a temperature at least 150° C.

11. As a composition of matter, the reaction product obtained by reacting an organic compound selected from the group consisting of an oxygen-containing organic compound containing only carbon, oxygen and hydrogen in the molecule and a high molecular weight hydrocarbon with hydrogen sulfide-ammonium hydrosulfide at between about room temperature and 100° C. until at least 4% of sulfur has entered the reaction product and treating the resultant reaction product with from about 1 to 15 moles of a tetravalent metal halide said metal being selected from group IV–A of the periodic table and having an atomic number from 50 to 82, inclusive, and the halide having an atomic number no greater than 35, at a temperature of from about 100° C. to 200° C.

12. As a composition of matter, the reaction product obtained by reacting a high molecular weight hydrocarbon with hydrogen sulfide-ammonium hydrosulfide at about room temperature and 100° C. until at least 4% of sulfur has entered the reaction product and treating the resultant reaction product with from about 1 to about 15 moles of a tetravalent metal halide said metal being selected from group IV–A of the periodic table and having an atomic number from 50 to 82, inclusive, and the halide having an atomic number no greater than 35, at a temperature of from about 100° C. to 200° C.

13. As a composition of matter, the reaction product obtained by reacting a cyclic ketone fraction having at least 12 carbon atoms with hydrogen sulfide-ammonium hydrosulfide at about room temperature and 100° C. until at least 4% of sulfur has entered the reaction product and treating the resultant reaction product with from about 1 to about 15 moles of a tetravalent metal halide said metal being selected from group IV–A of the periodic table and having an atomic number from 50 to 82, inclusive, and the halide having an atomic number no greater than 35, at a temperature of from about 100° C. to 200° C.

14. As a composition of matter, the reaction product obtained by reacting a wax olefin with hydrogen sulfide-ammonium hydrosulfide at about room temperature and 100° C. until at least 4% of sulfur has entered the reaction product and treating the resultant reaction product with from about 1 to about 15 moles of a tetravalent metal halide said metal being selected from group IV-A of the periodic table and having an atomic number from 50 to 82, inclusive, and the halide having an atomic number no greater than 35, at a temperature of from about 100° C. to 200° C.

15. As a composition of matter, the reaction product obtained by reacting about 1 mole of a saturated cyclic ketone fraction having at least 12 carbon atoms with ammonium hydrosulfide-hydrogen sulfide, at between about room temperature and 100° C. until at least about 4% of sulfur has entered the reaction product and treating about 1 mole of the resulting reaction product with about 4 moles of tin tetrachloride at a temperature from about 100° C. to 200° C.

16. As a composition of matter, the reaction product obtained by reacting about 1 mole of an unsaturated cyclic ketone fraction having at least 12 carbon atoms with ammonium hydrosulfide-hydrogen sulfide, at between about room temperature and 100° C. until at least about 4% of sulfur has entered the reaction product and treating with about 1 mole of the resulting reaction product with about 4 moles of tin tetrachloride at a temperature from about 100° C. to 200° C.

References Cited in the file of this patent

UNITED STATES PATENTS

| | | |
|---|---|---|
| 2,449,933 | Giammaria | Sept. 21, 1948 |
| 2,487,840 | Van Ess | Nov. 15, 1949 |
| 2,489,249 | Adelson | Nov. 29, 1949 |
| 2,512,784 | Adelson | June 27, 1950 |